United States Patent
Gringeler et al.

(10) Patent No.: US 7,184,603 B2
(45) Date of Patent: Feb. 27, 2007

(54) SYSTEM AND METHOD FOR LOSSLESS COMPRESSION OF DIGITAL IMAGES

(75) Inventors: Yaakov Gringeler, Petach Tikva (IL); Darryl Lovato, Royal Oaks, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 172 days.

(21) Appl. No.: 11/029,437

(22) Filed: Jan. 4, 2005

(65) Prior Publication Data

US 2006/0104525 A1    May 18, 2006

Related U.S. Application Data

(60) Provisional application No. 60/628,377, filed on Nov. 15, 2004, provisional application No. 60/628,376, filed on Nov. 15, 2004.

(51) Int. Cl.
*G06K 9/36*    (2006.01)
*G06K 9/46*    (2006.01)

(52) U.S. Cl. .................................... 382/244; 382/238
(58) Field of Classification Search ............... 382/166, 382/233, 238, 239, 244
See application file for complete search history.

(56) References Cited

U.S. PATENT DOCUMENTS

| | | | | |
|---|---|---|---|---|
| 5,408,542 A | * | 4/1995 | Callahan | 382/244 |
| 5,708,511 A | * | 1/1998 | Gandhi et al. | 382/239 |
| 6,731,814 B2 | * | 5/2004 | Zeck et al. | 382/239 |

* cited by examiner

*Primary Examiner*—Phuoc Tran
(74) *Attorney, Agent, or Firm*—Craig M. Stainbrook; Stainbrook & Stainbrook, LLP

(57) ABSTRACT

A method for improving lossless image compression by using multiple lossless image compression techniques and adapting the best one to each image. An RGB compressor receives an image file and splits the image into rectangular block types. Different digital image and/or sub-image (block) types are optimally compressed using a compression techniques particularly well-suited for the particular kind of image or block.

15 Claims, 2 Drawing Sheets

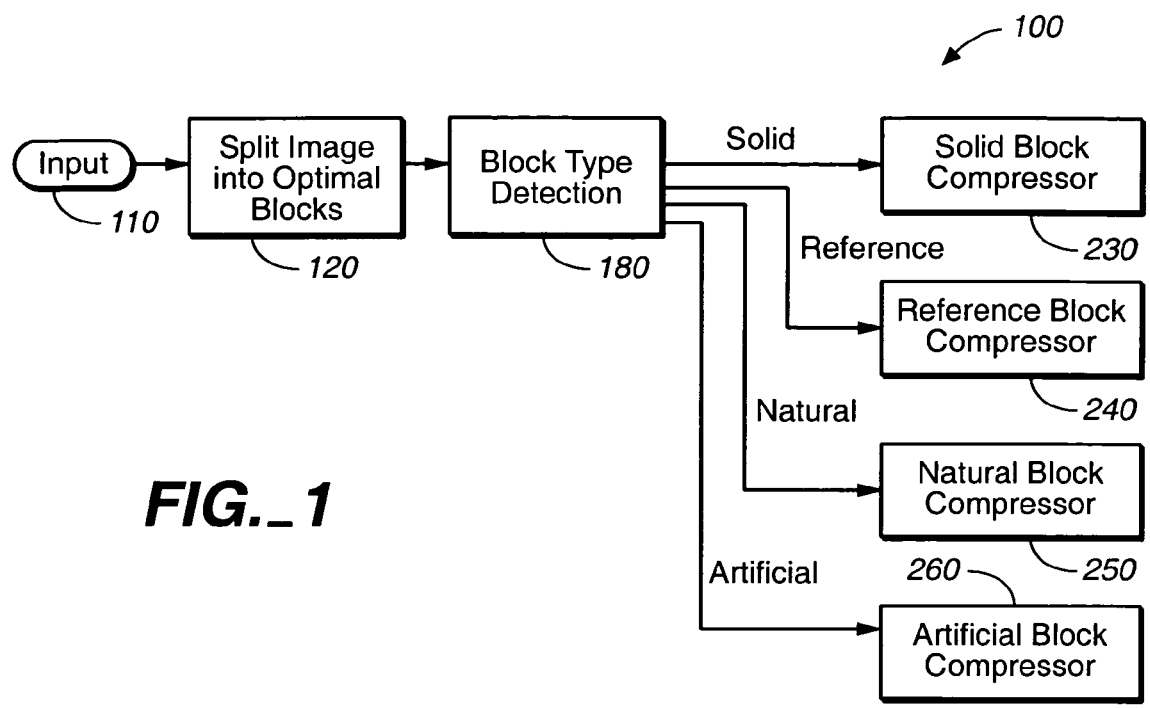
FIG._1
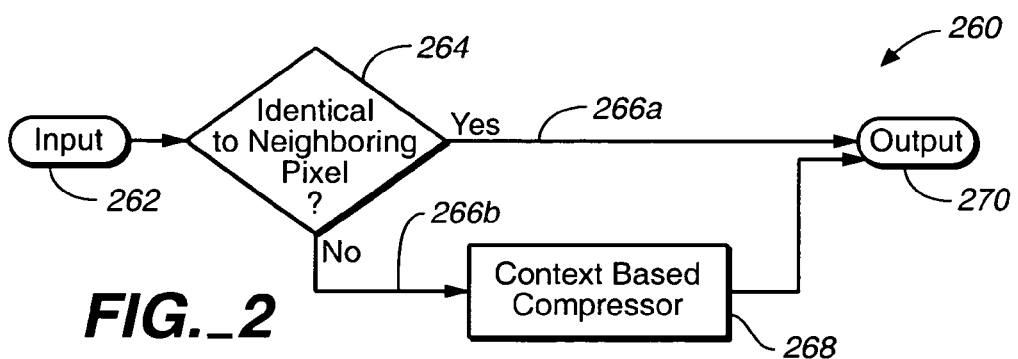
FIG._2
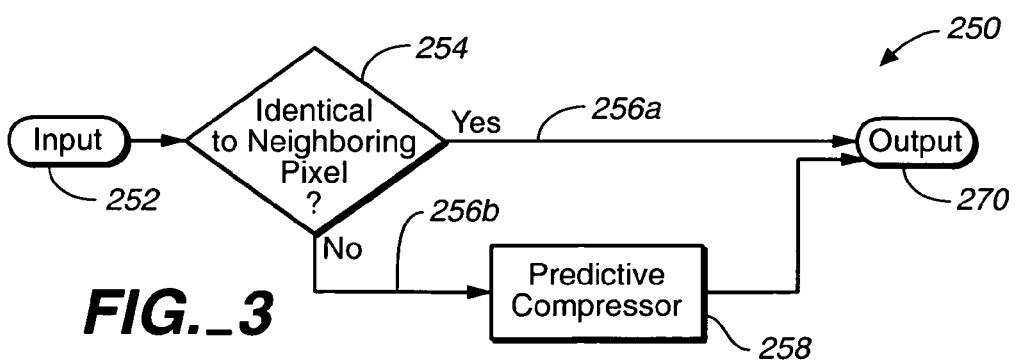
FIG._3

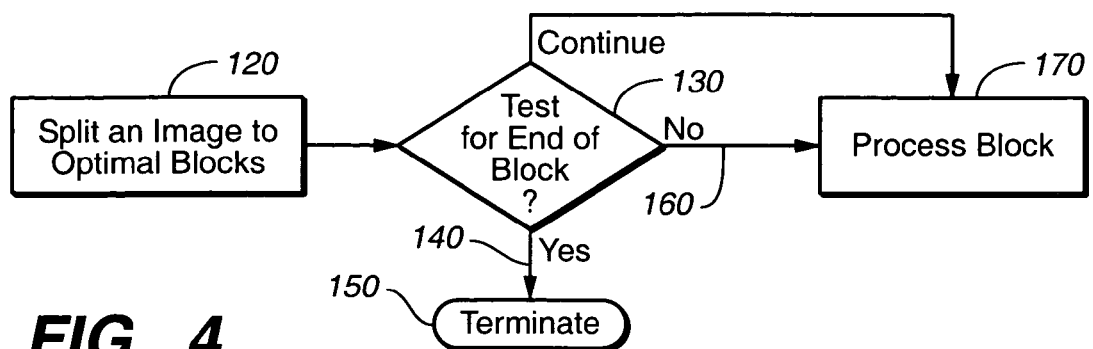
FIG._4
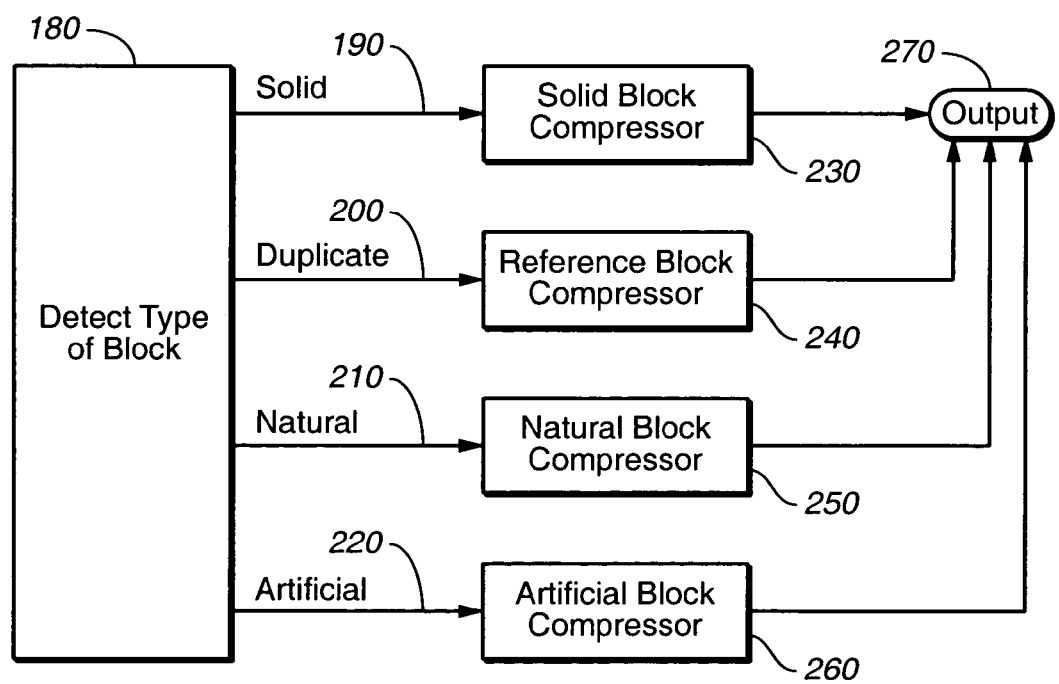
FIG._5

SYSTEM AND METHOD FOR LOSSLESS COMPRESSION OF DIGITAL IMAGES

CROSS REFERENCE TO RELATED APPLICATIONS

The present application claims the benefit of the filing date of U.S. Provisional Patent Application, Ser. No. 60/628, 377, filed Nov. 15, 2004, bearing the title, "Compressor of Already Compressed Files"; and U.S. Provisional Patent Application Ser. No. 60/628,376, filed Nov. 15, 2004, bearing the title, "Improvements to Lossless Image Compression.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to data compression and decompression, file archiving, and image compression. More particularly the present invention relates to a system and method for the lossless compression of digital images.

BACKGROUND INFORMATION AND DISCUSSION OF RELATED ART

The use of data compression or encoding schemes to reduce the size of files for backup or file transmission is well known in the art. Many types of data and files are compressed, including images in the well known GIF and JPEG formats (though including many others), video in the MPEG format, sound in MP3 and other formats, as well as standard archive formats, such as SIT, ZIP, GZIP, and so forth. Furthermore, many types of files have compressed images embedded inside, e.g., PDF files, WORD documents, and the like.

Files and data streams that have been compressed using sub-optimal techniques now comprises a major part of existing data, both for storage and transmission. (As used herein "file" and "data stream" are used interchangeably to denominate an identified set of data elements which may exist in several forms, including in a discrete form, or combined or stored with other files, or embedded in another file as a file or as an object, or as a file containing other files, or as a data stream of determinate or indeterminate size, including information transmitted over a data channel.) Compressed files are frequently large, and despite the considerable advances made in mass-storage density, computer processor speeds, and telecommunication system performance, compression techniques do not yet satisfactorily solve the space and transmission bandwidth problems. Developers of compression technology are now hard pressed to keep pace with the rapid growth of multimedia web-based applications which utilize enormous amounts of data. It would be advantageous, therefore, to provide improved methods to compress digital image files. Moreover, it is desirable that such improved compression be lossless.

Accordingly, the present invention provides a digital image compression system and method that losslessly compresses digital images.

BRIEF SUMMARY OF THE INVENTION

The present inventive method addresses a number of shortcomings in the prior art, and in so doing achieves a number of objects. Among them:

It is an object of the present invention to provide a system and method to improve lossless image compression by using multiple lossless image compression techniques and adapting the best one to each image.

Yet another object of the present invention is to provide a method to improve lossless image compression by marking identical neighboring pixels, instead of compressing them.

Still another object of the present invention is to provide a method to improve lossless image compression by adjusting weights of predictors based on their accuracy in neighboring pixels.

A further object of the present invention is to provide a method to improve lossless image compression and lossless video compression by transforming the prediction errors to improve their compressibility.

A still further object of the present invention is to provide a method to improve lossless video compression by using multiple compression techniques and applying the best method to every frame, or movie or any part of it.

Another object of the present invention is to provide a method to improve lossless video compression by allowing pixels to be marked as identical to another pixel in any of the three dimensions, namely, a pixel can be marked as identical to a pixel in the same frame or in another frame.

A still further object of the present invention is to provide a method to compress pixels in video compression by using a three dimensional predictor, namely, a predictor that can use pixels in the same frame and/or in another frame.

It is another object of the present invention to provide a method to improve the compression of images by splitting them into optimized rectangular blocks. Each block is potentially compressed by a different method, optimized to the particular characteristics of that block.

It is still another object of the present invention to provide a method to determine if an image, or sub-image, is natural or artificial, and using a compression method, optimized for natural or artificial blocks, based on the determination.

Another object of the present invention is to provide a method of determining if an image, or sub-image, is natural or artificial, by examining the ratio of pixels which are identical to neighboring pixels.

Still another object of the present invention is to provide a method of determining if an image, or sub-image, is natural, or artificial, by examining the ratio of unique colors to the total number of pixels in the image or sub-image.

A further object is to provide a method to improve the compression of images by using a reference to a previous sub-image, or previous sub-images, if they match the current sub-image or a run of sub-images starting at the current sub-image.

Yet another object is to provide a method of creating a key for every sub-image.

And yet another object is to provide a method to create a sub-image key based on a combination of image data and sub-image dimensions.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a schematic flow diagram illustrating the general functional elements of an RGB compressor structure applying the method of lossless image compression of the present invention;

FIG. 2 is a schematic flow diagram showing a compressor structure adapted for compressing artificial images;

FIG. 3 is a schematic flow diagram showing a compressor structure adapted for compressing natural images;

FIG. 4 illustrates the image splitting step of the inventive lossless image compressor; and FIG. 5 is a schematic flow diagram showing how sub-image types are directed into independent compression streams for optimal compression by a type-selected processor.

DETAILED DESCRIPTION OF THE INVENTION

FIGS. 1 through 5 show a new and improved system and method for lossless compression of digital images. Referring now particularly to FIG. 1, in its first and most essential aspect, the present invention is a system and method to improve lossless image compression by using multiple lossless image compressors, each having an image-type-specific compression technique, and adapting the best compressor to each image.

Different digital images and sub-images (or blocks) may be of a different nature and may be optimally compressed using a compression technique particularly well-suited for the particular kind of image or block. In the method of the present invention, compressors are optimized for the various kinds of images and sub-images (or blocks), including indexed images, solid images, natural images, and artificial images, and also for reference data. Each image or sub-image (hereinafter referred to as a "block") is analyzed to determine which compressor is best suited for it, and then a suitable compressor is applied. Accordingly, in a first preferred embodiment, the present invention is a RGB (true-color) compressor 100, which receives an image file 110, and in a first step 120, splits the image into rectangular block types. An image file routinely includes a plurality of block types, including natural RGB blocks, solid color blocks, reference identical blocks, and artificial blocks calling for differing degrees of downsampling (i.e., skipping of pixels during the display or processing of the detection process). It will be understood and appreciated, however, that an image may be homogeneous, of entirely one type, and may not need to be split into optimal sub-image blocks. In such an event, the full image is treated as a special kind of uniform block, according to its type.

Referring now to FIG. 4, once the image has been split into optimal block types, the block types are tested 130 to determine whether the end of the block has been reached. If yes 140, the process is terminated 150 and the data passed to output. If no 160, then the block is processed 170.

FIG. 5 illustrates the processing steps for processing the blocks. The first step 180 is to detect the type of block and send each into separate compression streams 190, 200, 210, 220, after which the respective types are processed by optimal type-specific compressors, including solid block compressor 230, reference block compressor 240, natural block compressor 250, and artificial block compressor 260, and then passed to output 270.

Referring again to FIG. 1, it is shown that the detection of sub-image block types also determines whether or not the image or block to be compressed is a solid, reference, natural, or artificial image or block. If the image or block is a solid or reference block, it is compressed by an optimal compressor, 234, 240, respectively. If not, the following method is used to decide if it should be compressed as a natural image or as an artificial one. A count is made of the number of pixels which are identical to the pixel above or the pixel to the left. If the ratio of such pixels is greater than 100/256, the compressor optimized for artificial images is used; otherwise, the compressor optimized for natural images is used. A code identifying the compressor used is stored in the output stream.

It will be appreciated that artificial images or blocks could further be differentiated into indexed (pseudocolor) and grayscale blocks. Accordingly, each type is processed by an artificial block compressor under the method of the present invention.

To decompress the compressed image, the code for the compressor used to compress the image is read from the input stream, and the appropriate decompressor is invoked.

Referring now to FIGS. 2 and 3, it is seen that the artificial image compressor 260 and the natural image compressor 250, each receive input data 262, 252, and then perform an identity test to 264, 254, to determine whether neighboring pixels are identical. Specifically, identical neighboring pixels are marked, rather than compressed. The reason is that pixels which are identical to a neighboring pixel are very common in artificial images but also exist in natural ones. Encoding a special code to mark the fact that a pixel is identical to a certain other pixel is more economical, in terms of space, than compressing that pixel. The present inventive method uses such encoding for identical pixels and thereby achieves improved compression.

Accordingly, if the determination is Yes 266a, 256a, i.e., that neighboring pixels are identical, the data is passed to output 270; whereas if it is No 266b, 256b, then artificial image blocks are compressed with a context based compressor 268, and natural image blocks are compressed with a predictive compressor 258.

Thus, in one aspect, the present invention may be characterized as a method to improve lossless image compression by marking identical neighboring pixels, instead of compressing them. Decoding after this compression proceeds as follows: When the decoder encounters a code which means that the pixel is identical to another pixel, it then copies that pixel from the other pixel instead of decompressing it.

The present invention improves lossless image compression by adjusting weights of predictors based on their accuracy in predicting neighboring pixels. The natural image compressor employed in the present invention uses multiple predictors to predict the current pixel. The predictors are either neighboring pixels, such as the pixel above and the pixel to the left, or they are expressions based on neighboring pixels, such as the pixel above plus the pixel to the left minus the pixel above and to the left. The final predictor is a weighted average of all the predictors. The accuracy of the final predictor depends on the weights given to each predictor. The accuracy of the final predictor determines the compression level. When the final predictor is more accurate, better compression is achieved. The instant inventive method improves the weights of the predictors for each pixel by analyzing the accuracy of that predictor for neighboring pixels and making appropriate adjustments to the base weights. For each predictor, the decoder makes the same analysis and uses the same base weights, and in this way reconstructs the exact same weights as used by the encoder. The decoder then decompresses the pixel based on these weights.

The present invention also improves lossless image compression and lossless video compression by transforming the prediction errors to improve compressibility. In multi-channel color images, the prediction errors for the different colors are highly correlated. To improve compression, the inventive system transforms the prediction errors in the following way:

Let P0 be the prediction error for the first color
Let P1 be the prediction error for the second color
Let P2 be the prediction error for the third color
    Then the following transformation is performed:

$T0 = P0$ $T1 = P1 - P0$ $T2 = P2 - P1/2 - p2/2$

Only T0, T1 and T2 are compressed. Due to the correlation between P0, P1 and P2, T1 and T2 are usually smaller in numeric value than P1 and P2, and therefore more compressible, resulting in-an overall compression improvement.

To retrieve the prediction errors for the different colors, the decoder first decompresses the transformed values T0, T1 and T2. The prediction errors are derived as follows.

$P0 = T0$ $P1 = T1 + P0$ $P2 = T2 + P1/2 + P0/2$

The inventive method further improves lossless video compression by using multiple compression techniques and applying the best method to every frame, or movie or any part of it. As with image files, different video streams include different types of sub-images. Overall compression is improved by applying for each video stream a compression algorithm best optimized for that kind of stream. For example, cartoons are poorly compressed by the common techniques optimized for natural scenes. Cartoons are better compressed by a specialized algorithm. The code of the compressor used is encoded into the output stream. And the code for the compressor used is decoded from the input stream and the right decompressor is invoked.

The inventive method further improves lossless video compression by allowing pixels to be marked as identical to another pixel in any of the three dimensions. That is, a pixel can be marked as identical to a pixel in the same frame or in another frame. Pixels which are identical may occur in any kind of video stream and in particular, most frames share many pixels, or most pixels, with the previous frame. When a pixel is identical to another one, storage space can be saved by encoding a code that indicates that the pixel is identical to another pixel, and to which one. Pixels used for this purpose may be in the same frame and may be in another frame, not necessarily in the same position. Under this compression scheme, when the decoder encounters a code which mean that the pixel is identical to another pixel, it then copies that pixel from the other pixel instead of decompressing it.

Next, the present invention improves compression of pixels in video by using a three dimensional predictor, namely, a predictor that uses pixels in the same frame and/or in another frame. Predictors are a very important compression technology. When using predictors to a value, only the prediction error needs to be encoded, provided that the decompressor can reconstruct the predictor. The proximity of a predictor to the value it tries to predict determines the compression ratio achieved. The use of predictors that rely on values from all three dimension (inter-frame and intra-frame) improves considerably the quality of the predictors since consecutive frames tend to be similar.

For the prediction-based compression described in the immediately preceding paragraph, the decoder decompresses the prediction error, and since it can reconstruct the three dimensional predictors, it can reconstruct the full value.

As noted, the instant invention improves the compression of images by splitting them to optimized rectangular blocks, typically including natural RGB blocks, artificial RGB blocks, solid color blocks, indexed blocks, and references to identical blocks. Each block is potentially compressed by a different method, optimized to the particular characteristics of that block. Frequently, images are composed of sections which are different in nature. For example, when editing or retouching natural images, artificial objects, like text or solid background, are added. Images are better compressed by methods adapted to their particular nature. This is also the case for sections of images. Further, the present invention down-samples, or converts, an original 24-bit RGB block into an indexed block if the block includes only a few colors. An original indexed image with 256 possible colors, but which includes only 16 colors, for example, can be down-sampled to 16.

The method of the present invention splits an image file into optimized rectangular blocks. The optimized dimensions of each rectangle are determined based on the data in and around the rectangle. Both height and width of a rectangle can vary: different heights can be used in different parts of an image. The present method analyzes each block to determine which method is optimal for the compression of that block. Then each block is compressed with the optimal method. The map indicating which method is used for every block is written to the output stream. Then in decompression, the decoder reads from the input stream the map which indicates the dimensions of each block and the method used to compress that block. Using this information, the decoder applies to each compressed block the correct decompressor The present invention improves lossless image compression by determining if an image, or sub-image, is natural or artificial, and employs a compression method, optimized for natural or artificial blocks, based on the determination. In data compression in general, and in image compression in particular, compression rates are improved by using methods which were optimized to the particular type of data being compressed. The present invention exploits this improvement potential in a two step process: First, image or sub-image is analyzed in order to determine if the image data represents a natural image or an artificial one. After making the determination, it applies a compression method optimized for either natural or artificial images, based on the type of image or sub-image. The information regarding which compressor has been used is written to the output stream, and when decoding an image or sub-image, it reads from the input stream the type of compressor that was used for that image or sub-image. The appropriate decompressor is invoked.

The present invention also provides a method of determining if an image, or sub-image, is natural or artificial, by examining the ratio of pixels which are identical to neighboring pixels. The first method of making such a determination works as follows: A set of pixels is examined and tested to determine whether or not each pixel is identical to the pixel above it or the pixel to the left of it. The ratio of identical pixels is then compared to a hard-coded threshold, and if it is below that threshold, the image or sub-image is denominated artificial; otherwise, it is identified as natural. This functionality has no impact on the decoder since the type of compressor used is read from the input stream.

Further, the present invention provides a method of determining if an image or sub-image is natural or artificial by examining the ratio of unique colors to the total number of pixels in the image or sub-image. This alternative or supplemental method of determining whether an image or sub-image is natural or artificial works as follows: The pixels in an image or sub-image are examined and the number of unique colors used is counted. The ratio of unique pixels to total pixels is determined, and if the ratio is below a hard-coded threshold, the image or sub-image is denominated artificial; otherwise, it is denominated as natural. This functionality also has no impact on the decoder since the type of compressor used is read from the input stream.

Next, the present invention improves the compression of images by using a reference to a previous sub-image, or previous sub-images, if they match the current sub-image or a run of sub-images starting at the current sub-image. In many cases, images contain identical sub-images. This is especially the case in artificially created images or photographs of artificial objects. Examples of that are charts and scanned documents. Such images can contain multiple occurrences of letters, lines, solid-color areas, and various image objects. When a sub-image occurs more than once, the inventive method improves compression by encoding a reference to a previous occurrence. Compression is improved because the reference takes less space (and frequently much less space) than encoding the sub-image. Such a reference may be either single or multiple. In the case of a single reference, the reference is to a sub-image identical to the current sub-image being encoded. In the case of a multiple reference, the reference is to a run of sub-images which is identical to the run of sub-images which start at the current sub-image being encoded.

When decompressing a sub-image, the decoder first checks if the encoding is by reference. If the encoding was by reference, the decoder retrieves the reference and copies image data from the sub-image pointed to by the reference. The reference can be either to a single sub-image or a run of sub-images which starts at the current sub-image being decoded. If the encoding is not by reference, the decoder continues normally to decompress the sub-image.

Next, the present invention provides mean to create a key for every sub-image. When it divides an image to sub-images, it assigns a search key to each sub-image. When previous sub-images are searched, the usage of a search key speeds-up the search process significantly. This functionality has no impact on the decoder and is implemented only in the encoder.

Finally, the inventive method provides means to create a sub-image key based on a combination of image data and sub-image dimensions. When creating sub-image keys, it uses a combination of image data and sub-image dimensions. This method improves the performance of searching sub-images, because it seeks a match in both image data and sub-image dimensions. This method has no impact on the decoder and is implemented only in the encoder.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative method and processing steps, decision options, functional elements, structural arrangements, operational features or the like.

Therefore, the above description and illustrations should not be construed as limiting the scope of the invention, which is defined by the appended claims.

What is claimed as invention is:

1. A method of lossless compression of digital image files, said method comprising the steps of:
   (a) receiving an input data stream having more than one type of digital image block;
   (b) providing a plurality of lossless image compressors, each using an image-type-specific compression technique;
   (c) detecting the block type or types in the input data stream;

(d) selecting the best compressor from the plurality of compressor for each block type in the input data stream; and
(e) compressing the blocks using the compression techniques used by the compressors selected in step (c);
(f) providing a RGB compressor; and
(g) splitting the input data stream in step (a) into rectangular optimal block types.

2. The method of claim 1, further including the step of assigning a search key to each block.

3. The method of claim 2, wherein each search key is based on a combination of block data and block dimensions.

4. The method of claim 1, wherein the step of splitting the input data stream includes splitting the data into natural RGB blocks, artificial RGB blocks, solid color blocks, indexed blocks, and references to identical blocks.

5. The method of claim 1, further including the step of:
testing the block types to determine whether the end of the block has been reached;
terminating block processing if the end of the block has been reached and passing the data to output;
detecting the types of blocks;
sending each block into a compression streams with blocks of like type if the end of the block has not been reached; and
compressing the blocks in the compression streams using the compressors selected in step (d).

6. A method of lossless compression of digital image files, said method comprising the steps of:
(a) receiving an input data stream having at least one digital image block;
(b) providing a plurality of lossless image compressors selected from the group consisting of a solid block compressor, a reference block compressor, a natural block compressor, an artificial block compressor, and/ or any combination thereof, each using an image-type-specific compression technique;
(c) detecting the block type or types in the input data stream;
(d) selecting the best compressor from the plurality of compressor for each block type in the input data stream; and
(e) compressing the blocks using the compression techniques used by the compressors selected in step (c).

7. A method of lossless compression of digital image files, said method comprising the steps of:
(a) receiving an input data steam having at least one digital image block;
(b) providing a plurality of lossless image compressors, each using an image-type-specific compression technique;
(c) detecting the block type or types in the input data stream to determine whether the block to be compressed is a solid, reference, natural, indexed, or artificial block;
(d) selecting the best compressor from the plurality of compressor for each block type in the input data stream;
(e) compressing the blocks using the compression techniques used by the compressors selected in step (c);
(f) compressing the block with an optimal compressor if it is an indexed, solid, or reference block; and
(g) determining whether the block should be compressed as a natural image or as an artificial image, if the block is not a solid or reference block.

8. The method of claim 7, wherein the determining step comprises the following steps:
counting the number of pixels having identical pixels above or to the left;
using a compressor optimized for artificial images if the ratio of such pixels is greater than 100/256;
using a compressor optimized for natural images if the ratio of such pixels is less than 100/256.

9. The method of claim 8, wherein artificial image blocks are compressed with a context based compressor, and natural image blocks are compressed with a predictive compressor.

10. The method of claim 8, wherein whether the block is artificial or natural is determined by examining the ratio of unique colors to the total number of pixels in the block, using the following steps:
counting the number of uniquely colored pixels;
determining the ratio of unique pixels to total pixels in the block;
denominating the block artificial if the ratio is below a hard-coded threshold; and
denominating the block natural if the ratio is above a hard-coded threshold.

11. A method of lossless compression of digital image files, said method comprising the steps of:
(a) receiving an input data stream having at least one digital image block;
(b) providing a plurality of lossless image compressors, each using an image-type-specific compression technique;
(c) detecting block type or types in the input data stream;
(d) selecting the best compressor from the plurality of compressor for each block type in the input data stream;
(e) compressing the blocks using the compression techniques used by the compressors selected in step (c);
wherein when the input data stream of step (a) includes pixels in a digital video file, identical neighboring pixels are encoded by the compressor rather than compressed, and further including the steps of: (i) providing a decoder to detect codes identifying a pixel as identical to another pixel; (ii) copying pixels identified in step (I) rather than decompressing them.

12. The method of claim 11, further including the steps of:
adjusting the weights of predictors based on their accuracy in predicting neighboring pixels;
using a natural image compressor having multiple predictors to predict the current pixel, wherein the predictors are either neighboring pixels or they are expressions based on neighboring pixels, and wherein a the final predictor is a weighted average of all the predictors.

13. The method of claim 12, further including the steps of:
analyzing the accuracy of a predictor for neighboring pixels;
making appropriate adjustments to the base weights;
reconstructing the exact weights used by the compressor by using the decoder, for each predictor, to make the same analysis using the same base weights; and
decompressing the pixels based on these weights.

14. A method of improving lossless image compression and lossless video compression by transforming, prediction errors to improve compressibility, wherein when compressing multi-channel color images, the prediction errors for the different colors are highly correlated, and wherein the prediction errors are transformed in the following way:
Let P0 be the prediction error for the first color
Let P1 be the prediction error for the second color
Let P2 be the prediction error for the third color Then the following transformation is performed:

$T0=P0$ $T1=P1-P0$ $T2=P2-P1/2-p2/2;$ and wherein only T0, T1 and T2 are compressed.

15. The method of claim 14, further including the step of retrieving the prediction errors for the different colors using the following steps:

decompressing the transformed values T0,T1 and T2; and deriving the prediction errors as follows:

$P0=T0$ $P1=T1+P0$ $P2=T2+P1/2+P0/2.$

* * * * *